United States Patent
Harste

(10) Patent No.: US 12,366,018 B2
(45) Date of Patent: Jul. 22, 2025

(54) PROCESS FOR MANUFACTURING NON-WOVEN FABRIC-LIKE COMPOSITE MATERIALS FROM SHREDDED POLYMER-COATED PAPER PRODUCTS AND COFFEE GROUNDS

(71) Applicant: CHOPVALUE MANUFACTURING LTD., Vancouver (CA)

(72) Inventor: Dirk Harste, Hamburg (DE)

(73) Assignee: Chopvalue Manufacturing Ltd., Vancouver (CA)

( * ) Notice: Subject to any disclaimer, the term of this patent is extended or adjusted under 35 U.S.C. 154(b) by 312 days.

(21) Appl. No.: 17/941,258

(22) Filed: Sep. 9, 2022

(65) Prior Publication Data
US 2023/0074931 A1 Mar. 9, 2023

(30) Foreign Application Priority Data
Sep. 9, 2021 (EP) .................................. 21195673

(51) Int. Cl.
| | | |
|---|---|---|
| B29B 9/00 | (2006.01) | |
| B29C 41/16 | (2006.01) | |
| B29C 41/50 | (2006.01) | |
| B29C 71/02 | (2006.01) | |
| C08J 5/04 | (2006.01) | |
| D04H 1/425 | (2012.01) | |
| D04H 1/4274 | (2012.01) | |
| D04H 1/65 | (2012.01) | |
| D21B 1/08 | (2006.01) | |
| D21C 5/02 | (2006.01) | |
| B29K 105/26 | (2006.01) | |

(52) U.S. Cl.
CPC ............... *D04H 1/65* (2013.01); *C08J 5/045* (2013.01); *B29K 2105/26* (2013.01); *C08J 2300/22* (2013.01); *C08J 2300/30* (2013.01); *D10B 2401/041* (2013.01)

(58) Field of Classification Search
CPC ........... B29B 9/00; B29C 41/16; B29C 41/50; B29C 71/02; B29K 2105/26; C08J 5/045; C08J 2300/30; D04H 1/425; D04H 1/4274; D21B 1/08; D21C 5/02
USPC ......... 264/87, 115, 122, 140, 234, 913, 914; 162/4
See application file for complete search history.

(56) References Cited

U.S. PATENT DOCUMENTS

| | | |
|---|---|---|
| 4,855,343 A | 8/1989 | Degen et al. |
| 4,870,979 A | 10/1989 | Browning et al. |
| 6,426,381 B1 | 7/2002 | König et al. |
| 6,699,536 B2 | 3/2004 | Katoh et al. |
| 2007/0014940 A1 | 1/2007 | Linhart et al. |
| 2010/0166985 A1 | 7/2010 | Brockmeyer et al. |
| 2010/0236736 A1 | 9/2010 | Brockmeyer et al. |
| 2013/0062029 A1 | 3/2013 | Levin et al. |
| 2021/0105956 A1 | 4/2021 | Langguth |
| 2022/0204707 A1 | 6/2022 | Wilka |

FOREIGN PATENT DOCUMENTS

| | | |
|---|---|---|
| CN | 110284361 A | 9/2019 |
| CN | 110284361 B | 12/2020 |
| CN | 112078208 A | 12/2020 |
| WO | 2021047802 A1 | 3/2021 |
| WO | 2021154192 A1 | 8/2021 |

OTHER PUBLICATIONS

European Search Report, EP21195673.5, dated Mar. 3, 2022, 7 pages.
Machine translation corresponding to WO2021154192 published Aug. 5, 2021, 6 pages.

*Primary Examiner* — Leo B Tentoni
(74) *Attorney, Agent, or Firm* — Oliff PLC

(57) ABSTRACT

The invention relates to a process for producing non-woven fabric-like composite materials, novel non-woven fabric-like composite materials, articles made therefrom and their use. In particular the fabric-like composite materials are derived from shredded polymer-glued or polymer-coated paper products and coffee grounds as raw material.

16 Claims, No Drawings

PROCESS FOR MANUFACTURING NON-WOVEN FABRIC-LIKE COMPOSITE MATERIALS FROM SHREDDED POLYMER-COATED PAPER PRODUCTS AND COFFEE GROUNDS

CROSS-REFERENCE TO RELATED APPLICATIONS

This application claims priority to European Patent App. No. EP 21 195 673.5, filed 9 Sep. 2021, which is hereby incorporated by reference in its entirety.

DESCRIPTION

The invention relates to a process for producing non-woven fabric-like composite materials, novel non-woven fabric-like composite materials and their use. In particular the fabric-like composite materials are derived from shredded polymer-glued or polymer-coated paper products and coffee grounds as raw material.

BACKGROUND

One of the major challenges facing humanity in recent years is the reduction of $CO_2$ emissions in the earth's atmosphere. On the one hand, this is achieved by reducing the use of fossil fuels, but on the other hand, processes for storing $CO_2$ in the earth are also being investigated. In principle, a first step is the increased use of renewable raw materials in technical areas such as automotive, consumer goods etc., which temporarily store $CO_2$ at least for a few years and are neutral in the $CO_2$ balance in the short term during this phase of use.

These include, for example, biodegradable starch films or veneer woods which, modified accordingly, are used as paneling in car interiors. It would be particularly desirable if not only newly produced materials could be used for such applications, but also raw materials that would otherwise be discarded as waste.

One raw material relevant to the invention are paper products with polymer-coating or which otherwise contain polymers, e.g. as a glue material.

Paper products coated with (or otherwise containing) polymers find numerous applications, especially in paper grades whose inkjet printability can be improved by a polymer coating, i.e. all graphic papers, natural paper, coated papers or cardboard and board. The polymer is applied to the surface of the paper or cardboard, for example as an aqueous dispersion or aqueous solution, and the paper or cardboard treated in this way is dried.

Such polymer dispersions or aqueous solutions of the polymers and the coating process for paper are described in the literature, including WO2004/096566A1, U.S. Pat. No. 6,699,536 and WO2008/142003A1.

Such polymer-containing (polymer-coated) paper products are produced in large quantities worldwide and are widely used as printed advertisement or catalogue materials, disposable paper products, including polymer-coated paper take-away cups, dishes, bowls, bags, and beverage cartons, or printed packages for all kind of products.

After use such polymer-containing paper products are usually burned or recycled as "waste-paper" or "recovered paper." Generally, recycling means a process of converting waste materials into new materials and objects or their raw materials are turned into secondary raw materials. The recovery of energy from waste materials is often included in this concept. The recyclability of a material depends on its ability to reacquire the properties it had in its virgin or original state. A specific aspect of recycling methods is the so-called upcycling, which describes a creative reuse of the waste materials, and which is a process of transforming by-products, waste materials, useless, or unwanted products into new materials or products perceived to be of greater quality or environmental value. The recovery of waste-paper from paper products is of high economic importance in the paper industry to save resources. The term "waste-paper" or "recovered paper" is based on DIN 6730 and is therein defined as paper or cardboard that is returned from production or processing in used or unused form to be fed back into a manufacturing process as semi-finished material. In Germany alone, the recovered paper use rate, i.e. the share of recovered paper in total domestic paper production, was 65% in 2003. Usually, recovered paper is used as a secondary raw material in paper and cardboard production. However, waste-paper cannot be recycled as often as desired. With each recycling cycle, the fibers are shortened due to mechanical stress and lose the ability to reconnect into a sheet structure after about 4 to 6 cycles, which in turn has a negative impact on paper strength. In addition, the contamination of the recycled paper increases with an increase in the number of recycling cycles, as inorganic and especially organic impurities, such as polymers, cannot be completely separated and consequently accumulate.

The known processes to recover (recycle) polymer-containing paper products are time and cost consuming and regardless of the method of recovered paper processing, the separation of impurities and of polymers with which the paper products are coated is insufficient. In particular, paper products coated with polymers are hardly accessible to waste-paper recycling or only at the cost of problems, since the polymers lead to deposits during the papermaking process from waste-paper, in particular on parts of the paper machine, as well as to quality losses of the manufactured paper products. The deposit behavior of such polymers is exacerbated by the fact that they are usually poorly water-soluble or even water-insoluble and tend to agglomerate. Due to the necessary cleaning work, this leads to a regular standstill of the machines and in some cases even to a loss of production during the manufacturing process and accordingly to high costs.

As mentioned above, polymer-coated paper products are increasingly used in gastronomy, catering and fast-food restaurants or snack bars, for example, as paper bags for dry food or for liquids, as cardboard cups, as beverage cartons and cartons for liquids. The polymer-coating, on the one hand, provides the paper product with a certain dimensional stability and, on the other hand, makes the paper product impermeable to liquids and thus easy to handle, especially for the end consumer. Therefore, such polymer-coated paper products established as disposable packaging, which increasingly enhance the production of waste.

Packaging and paper products coated with PE (polyethylene) or polyacrylates or polystyrene acrylates or other vinyl polymers or polyesters have been known for a long time, especially in the fields of foodstuffs (e.g. for beverages), cosmetics and cleaning agents, whereby the PE film or the other polymers used can be applied as a very thin barrier coating on the inside, outside and/or also between the different paper layers. Typically, such a paper product is coated with PE film or the other polymers to be used on at least one of the two surfaces.

The disadvantage of paper products coated with PE or other polymers is that they cannot be reused in the course of conventional recycling, but only in recycling facilities developed for this purpose. Such paper products are disposable materials and cannot be fed into conventional recycling processes, as is the case for other types of paper such as newsprint and magazine paper. Usually, paper products coated with PE or the other polymers used have to be incinerated, as composting is not possible either.

Furthermore, coated packaging, especially beverage cartons, are known under the trade name Tetra Pak®. These are also cardboard packaging coated with plastics, which usually also have an aluminum layer as a liquid-repellent layer. The recycling of the individual components of a Tetra Pak® package is also problematic. These must first be collected separately from the rest of the household waste. According to the manufacturer, recycling of Tetra Pak® packaging has been possible since 2008 thanks to a new plasma technology, whereby after the Tetra Pak® has been cut into small pieces, the cardboard is first separated from the aluminum foil and the plastic wrapping with the help of water. In the following step, the aluminum foil is separated from the plastic wrapping with the help of a plasma jet without burning the plastic, whereby the packaging can thus be almost completely separated into all three components: cardboard, plastic and aluminum.

Furthermore, all of the paper products mentioned, regardless of their use as e.g. graphic papers, PE-coated paper products or Tetra Pak® still contain polymeric gluing agents. Such gluing agents, which are known e.g. from EP0273770, EP0257412B2, WO99/42490A1 and WO2007/000420A1, cannot be completely separated in the known recycling processes either and lead to the same difficulties in the recovery process as the polymers with which the paper products were coated.

For ease of reference, the expression "polymer-coated paper (products)" used herein comprises all such polymer-containing paper products as described above. It is not limited to (inside or outside) surface coatings and further includes paper products, which contain polymers e.g. as a gluing material added in the paper production process.

The known processes for recovering glued or polymer-coated paper fibers from paper products thus have disadvantages regardless of the type and composition of the gluing and/or coating polymers, since the polymers often cannot be completely separated from the paper fiber. In particular the huge amounts of the aforementioned polymer-coated paper products, which are used as disposables or packages in the field of food, cosmetics and cleaning agents, are not at all amenable to recycling or can only be recycled with great difficulty and at high cost.

The unpublished European application EP21173892.7 describes an upcycling process for providing not only recycled (recovered) paper but new products of higher value based on polymer-coated paper waste, such as in particular thermoformable and/or embossable particle/polymer composites and particle/polymer molded parts obtainable therefrom, which are based on shredded (particulated) polymer-coated paper products.

Another raw material relevant to the invention is coffee grounds (CG). This is produced in large quantities worldwide (up to 4 million tons in Europe per year) and is usually either burned or added as soil fertilizer. In both cases, it is converted to $CO_2$ in the short term. A medium-term storage of $CO_2$ is not possible here.

Several approaches attempt to use coffee grounds as a component of a composite raw material, which are discussed in more detail in the international application WO2021/047802. This international application describes a process for producing a thermoformable and/or embossable particle/polymer composite and a particle/polymer molded part obtainable therefrom, which is based on a high proportion of coffee grounds.

Accordingly, the above cited WO2021/047802 and the unpublished European application EP21173892.7 describe already new methods for handling the arising amounts of coffee grounds wastes and of polymer-coated paper product wastes, respectively, as well as cost-effective processes for upcycling coffee grounds or polymer-coated paper products to thermoformable and/or embossable particle/polymer composites with panel-like structure to be used as boards, panels, molded articles or other non-flexible (non-elastic) parts.

WO2020/212062 describes the preparation of thermoplastic composite materials comprising at least one organic fiber material and at least one thermoplastic binder, such as bonded leather materials (LeFa). However, the process makes use of animal-based raw materials and is limited to the use of thermoplastic binders.

The inventors of the present invention surprisingly found a further new method of upcycling coffee grounds and polymer-coated paper waste products at the same time to obtain not only non-elastic/non-flexible panels or boards but completely new fabric-like composite materials. Such new fabric-like composite materials are comparable to known reconstituted fiber-based fabric like materials like bonded leather or similar products based on cellulose fibers. The new fabric-like products obtainable with the new process of the present invention can therefore also be considered as bonded leather substitute and therewith provide a non-animal-based substitute, which is of particular interest in view of the increasing demand for animal-friendly and vegan products.

Therefore, an object of the present invention is to provide a (further) new upcycling process for providing not only recycled (recovered) paper and coffee grounds but new products of higher value based on the polymer-coated paper waste and coffee grounds. A further object of the present invention is to provide a process for producing a non-woven, fabric-like material, which is based on shredded (particulated) polymer-coated paper products and/or coffee grounds and can be produced at low cost. A further object relates to providing new fabric-like composite materials as substitutes for the known reconstituted cellulose- and leather-based fabrics (such as bonded leather). A further object relates to providing new (reconstituted) non-woven fabrics and textiles or non-woven fabric-/textile-like surface covers for indoor applications, furniture, industrial and home textiles and decoration, clothing, shoes, and bags manufacturing. A further object of the invention was to provide a cost and energy saving process for recycling/upcycling paper waste products and coffee grounds.

The object has been solved by developing a new process of manufacturing fabric-like composite materials from paper-based particle/polymer composites based on a mixture of shredded polymer-coated paper products and coffee grounds. In particular, this object is achieved by the process according to the claims.

The object of the present invention is solved by providing a process of manufacturing fabric-like composite materials using a paper-based particle/polymer composite based on a particulate substrate (S) of a mixture of shredded polymer-glued or polymer-coated paper products and coffee grounds and at least one polymer P, characterized in that (i) the particulate substrate S, comprising a mixture of shredded polymer-glued or polymer-coated paper products and coffee grounds, is dispersed in water, (ii) to the so obtained dispersion is added a polymer P, preferably in the form of an aqueous dispersion, and (iii) optionally other additives e.g. pigments, oils, greases, fillers or other processing additives can be added in this stage, followed (iv) by adding a precipitation agent to the particle polymer mixture and (v) separating the precipitated particle composition by sieves and bringing into the desired form, preferably in the form of a layer or sheet (vi) removing the water excess by vacuum suction followed by pressing of the formed material, e.g. layer or sheet, (vii) followed by drying of the resulting form, e.g. layer or sheet.

Furthermore, the present invention relates to the fabric-like composite materials prepared from particle/polymer composites based on a mixture of shredded polymer-glued or polymer-coated paper products and coffee grounds and which can be obtained with the new method according to the invention. A further aspect of the invention relates to the use of such fabric-like composite materials for the manufacturing of non-woven fabric- or textile-like materials, such as for elements in buildings, including surface covers for indoor applications, such as wall covers, table laminates, floors, tiles, counters, or for furniture, industrial and home textiles and decorative textiles, for clothing and in bag and shoe manufacturing.

DETAILED DESCRIPTION OF THE INVENTION

A characteristic feature of the process according to the invention is that it is based on using a mixture of shredded (particulated) polymer-coated paper products (as defined above) and coffee grounds, which allows not only the recycling of these two waste products at the same time, but rather an upcycling to new products of high quality. By using the process described herein with a substrate based on a mixture of shredded (particulated) polymer-coated paper products and coffee grounds it is further possible to prepare fabric- or textile-like products, like substitutes for reconstituted cellulose fibers (also known in German as "ZeFa") or bonded leather (also known in German as "LeFa"), for a variety of possible applications mentioned herein, for example in applications wherein conventionally used textiles, leather or woven-fabrics are replaced by the much more environmentally friendly and sustainable non-woven fabric-like composite materials of the present invention.

To obtain the paper-based component of the substrate S for the process of the invention the polymer-coated paper products are particulated, e.g. by shredding, cutting, chopping, milling, or otherwise crushing paper products, which comprise a polymer-based glue and/or a polymer-coating.

Shredded (particulate) paper products used according to the invention may have a particle size of ≤5 mm length and ≤2 mm width. The ratio length/width is preferably ≥2.5, more preferably ≥5 and most preferably ≥20.

In principle, all polymer-coated paper products (as defined herein) can be used. In particular, the process according to the invention is suitable for recycling (upcycling) paper products, glued and/or coated with polymers, used as paper products which are coated on one or both sides and which are used for foodstuff (e.g. coffee to-go cups), paper bags for dry foodstuffs such as e.g. coffee, tea, soup powder, sauce powder; for liquids such as cosmetics, detergents, beverages, dairy products, tube laminates, paper carrier bags, paper laminates and coextrudates for ice cream, confectionery (e.g. chocolate and muesli bars), paper tape, cardboard cups (e.g. cardboard cups for cold and hot drinks), yoghurt cups, menu trays, wrapped cardboard containers (cans, barrels), wet-strength or moisture-resistant cardboard boxes for outer packaging (wine bottles, food), fruit crates made of coated cardboard, fast food plates, clamp shells, beverage cartons and cardboard boxes for liquids such as detergents and cleaning agents, frozen food cartons, ice-cream packaging (e.g. ice-cream cups, wrap-around cartons), paper labels and banderoles, flower and plant pots, special papers (e.g. sanding papers, filter papers). Preferably, the polymer-coated paper products are polymer-glued or polymer-coated paper products selected from polymer-coated disposable paper products, including polymer-coated paper take-away cups, dishes, bowls, bags, beverage cartons or packages.

In the process of the invention the waste-paper products are shredded (particulated), e.g. by shredding, cutting, chopping, milling, or otherwise crushing.

The second component of the substrate S, the coffee grounds, are the residual waste from industrial or in stores or home-made coffee extracts. The coffee grounds are already in particular shape and can differ in its particle size and distribution.

In the first step (i) of the process of the invention these two main components are mixed and dispersed in water to prepare the substrate S.

According to the invention, another essential component of the substrate S is the polymer P. It is preferably used in this process as aqueous dispersion (hereinafter also referred to as "aqueous polymer P dispersion") and can be selected from the group comprising polyacylates, styrenacrylates, styrene-butadien-acrylates, styren-butadien-polymers and natural rubber latices.

According to the invention, the polymer P is also referred to as a binder or binding agent.

In the case of preparing fabrics in a three-dimensional shape, preferably a thermoplastic polymer is used whose glass transition temperature $Tg^P$, measured according to DIN EN ISO 11357-2 (2013-09), is ≤40° C., preferably ≤20° C. and particularly preferably ≤10° C. Thermoplastic polymers P are understood to be those polymers which can be formed in a certain temperature range ($\geq Tg^P$), whereby this process is reversible, which means that it can be repeated several times by cooling and reheating. However, care must be taken to ensure that the polymer is not heated to the point where thermal decomposition of the polymer begins.

All thermoplastic polymers which have a glass transition temperature ≤40° C. determined according to the above-mentioned determination method can be used, such as acrylonitrile/butadiene/styrene copolymers, polyamides, polyacetates, homo- or copolymers of (meth)acrylates, styrene acrylates, polycarbonates, polyesters, such as polyethylene terephthalates, polyolefins, such as polyethylenes or polypropylenes, acid-modified polyethylenes and -polypropylenes, polystyrenes, polyether ketones, polylactic acid, ethylene/acrylic acid copolymers, polyvinyl chlorides or natural rubber.

In step (ii) of the process of the invention, the polymer P is contacted with the substrate S (based on the mixture of shredded paper products and coffee grounds) in the water phase. Therefore, the polymer P can be used in the form of an aqueous dispersion or and aqueous solution. Aqueous dispersions of polymers P are preferably used, while aqueous polymer solutions only play a minor role.

According to the invention, commercially available aqueous polymer dispersions can be used advantageously, which are usually offered as binders e.g. for paints, coatings or similar, e.g. Acronal® 5400, Acronal® 500D, Acronal® S589, Acronal® S360, Acronal® S560D (all BASF AG). All polymer dispersions can also be used in mixtures of any mixing ratio to adjust physical properties.

Preferably, the relation between the three components of the mixture of the substrate S with the polymer P (PP:CG:P, corresponding to Paper Products:Coffee Grounds:Polymer) can vary in the range of 30-85:0-60:10-45 weight % dry matter.

In the process of the invention the particulate substrate S and the polymer P are contacted with each other in a highly diluted water phase with a solid content between 0.5-3.0%. Conventional processes used for preparing bonded leather products use polymer/fiber composites on the basis of leather fibers (derived from leather scrap) and such processes are state of the art. Such processes, however, are not used or described for upcycling polymer-coated paper products and coffee grounds. Therein, the raw materials used are natural fibers, i.e. from leather scrap. In contrast, the present invention uses polymer-coated paper products, wherein the polymer-coating provides a non-polar coating/surface. The process of the invention for recycling/upcycling of paper waste products is mainly based on the sheet forming process used for preparing bonded leather fiber products. In principle the process conditions of the sheet forming process for bonded leather can be applied also in the process of the present invention. However, in the process of the present invention, the preparation of the used paper-based substrate S differs from the corresponding preparation step for preparing a leather-based substrate. Concretely, the conditions for preparing the shredded waste-paper pulp are adapted as follows:

In a first shredding/milling step the paper waste products are particulated by shredding, cutting, chopping, milling, or otherwise crushing the paper products, which comprise a polymer-based glue and/or a polymer-coating. Compared to shredding leather-fiber-products as used for bonded leather this first shredding/milling can be carried out more cost and energy saving, since it is generally easier to particulate the paper products used herein than the leather-products used for bonded leather. In the step of treating the particulated paper products with water (in a water tank) it is possible to use lower energy. When using leather-products usually milling grades of higher than 80 SR (Schopper Riegler Grade) or Canadian Freeness (CFS)), preferably >85 SR are applied in comparison to only 30-45 SR for the substrate S is required. Further, it is possible to apply shorter milling periods in the water tank. If leather-products are used longer milling periods are required to achieve sufficient separation of the leather-fibers. Since paper, such as used in the present invention, softens very quickly, the milling periods in the water tank can be reduced significantly. Finally, less energy is needed for milling the paper-particle pulp in the refiner because the refiner gap can be set much larger. Since paper is made from already disintegrated fibers, it is much easier to disintegrate the paper structure again. And also, the addition of coffee grounds does not need long mixing time and minimum milling energy due to already milled material. The solid content during milling and mixing of the paper and the coffee grounds is adjusted to a level between 1-8% solids.

After the milling and mixing of the raw materials, the dispersion of the polymer P, e.g. Acronal 5400, is added and the system further diluted down to 0.5-3% solids.

In an optional step (iii) further additives can be mixed into the mixed dispersion of substrate S and polymer P. Suitable optional additives can be selected from colorants, pigments, oils, greases, fillers, pH-adjustment or other processing additives and mixtures thereof.

After mixing the substrate S with the polymer P a precipitation agent, e.g. Polimin SK, is added in step (iv). Other suitable precipitation agents can be selected from metal salts eg. Aluminium sulfate ($Al_2(SO_4)_3$).

With the precipitation agent the solid components of the mixture agglomerate and in step (v) the resulting precipitate of the mixture of substrate S and polymer P "precipitate" is deposited on a sieve and brought in the desired form. In the following step (vi) the major part of the water is removed supported by vacuum suction and the deposited substrate S/polymer P precipitate obtains the desired forms, such as preferably a layer, sheet or floor.

In an alternative embodiment of the invention, it is also possible to fill the deposited substrate S/polymer P "precipitate" into a mold having the negative form of the desired three-dimensional shape to be obtained. With this alternative embodiment of the process of the invention, it is possible to obtain molded articles.

When preparing planar forms (such as layers, sheets or floors) in step (vi) the polymer-contacted substrate layer is then pressed, preferably between rollers or in a flat press, to squeeze further water out of the substrate S/polymer P layer. If a three-dimensional form is prepared, this step (vi) is omitted.

After this step, the formed material is dried in step (vii), preferably at temperatures up to 140° C. which allows to run the process faster in comparison to bonded leather production where the temperature should not be higher than 100° C. (90° C.) to avoid damage of the leather fiber, to form the fabric-like composite material of the invention. According to the invention, the deposited particle form, e.g. the layer (floor), is understood to be a form, e.g. layer (floor), of densely packed particles. Preferably the drying temperature is between 70° C. and 140° C.

Surprisingly, it turned out that the very unusual combination of shredded paper-waste products and coffee grounds allows to achieve a fabric- or textile-like material with exceptionally soft handle, even softer than leather fiber products.

The obtained forms, such as the layers, sheets or floors, can be processed further to increase mechanical properties or change the haptic or surface appearance. Planar forms can be processed further by pressing the layer (floor) at temperatures up to 140° C. to obtain higher densities. Pressing a grain into the surface and/or grinding the surface to influence the haptic of the material and or lacquer the surface to increase the resistance against abrasion or liquids is also possible. As mentioned above, pigments or colorants can be added into the mixture in the optional step (iii) to change the visual aspect of the resulting materiel (e.g. layer, sheet or floor). As mentioned above, addition of further or other additives is possible in accordance with the desired properties of the resulting fabrics. Usual additives that can be added to the polymer/substrate mixture comprise e.g. biocides, flame retardants, waxes, fragrances, dyes, pigments, UV-protection agents and/or other usual additives.

If a commercially available polymer dispersion is used, the polymer/substrate mixture naturally contains the auxiliary substances already contained in the polymer dispersion, such as dispersants and biocides.

If present in the form of a layer or floor the particle layer can have a thickness of ≥0.3 and ≤30 mm, advantageously ≥0.4 and ≤15 mm and especially advantageously ≥0.5 and ≤7.5 mm.

In the context of the invention, drying is to be understood as meaning that the residual moisture content of the obtained substrate S/polymer P mixture is reduced to ≤15 weight % and advantageously to ≤10 weight %, preferably to ≥5 and ≤10 weight %.

According to the invention, residual moisture content is understood to be the percentage difference in weight, relative to the substrate S/polymer P mixture used, which results when 1 g of substrate S/polymer P mixture is dried in a drying oven at 120° C. for one hour.

In the alternative embodiment of the invention, wherein the precipitate of the substrate S and the polymer P is filled in a mold of the desired shape, the polymer P is preferably a thermoplastic polymer the formed precipitate is then compressed (densified) at a temperature ≥$Tg^P$ to form a thermoformable and/or embossable fabric-like composite, which contains the mixture of the shredded polymer-coated paper products and coffee grounds. Compression (densification) is understood to mean when the particle layer (or filled mold) is compressed under pressure at a temperature ≥$Tg^P$ to form a thermoformable and/or embossable fabric-like composite. The density of the fabric-like composite is increased by a factor of ≥1 and advantageously by a factor of ≥5 compared to the corresponding particle layer (filled mold), depending on the particulate substrate S used. The compression/densification can be carried out in a way and to a degree that the density of the obtained fabric-like composite is increased by a factor up to 2 compared to the corresponding polymer-contacted (optionally pre-compressed) substrate layer (or filled mold) before densification.

The fabric-like composite obtainable after the drying of the present invention preferably has a density of 0.5 to 1.2 g/cm, most preferably 0.5 to 0.98 g/cm.

In this context, it is important to note that the fabric-like composite according to the invention has an advantageous planar flat shape. Of course, the fabric-like composite according to the invention can also have any non-planar three-dimensional shape, depending on the selected press mold, in the case of the specific embodiment of filling into a mold.

In the manufacturing of the fabric-like composite, advantageously the weight ratio between substrate S and polymer P is between ≥1 and ≤9. Preferably, between ≥1.5 and ≤6. That means, the fabric-like composite of the invention contains a very high amount of shredded paper product.

By the method according to the invention, especially fabric-like composites are accessible, having a basis weight ≥150 and ≤30000 g/m², especially advantageously ≥200 and ≤15000 g/m² and advantageously ≥250 and ≤7500 g/m². The fabric-like composites obtainable by the process according to the invention are flat or textile-like in one preferred design form and have a non-surface-shaped three-dimensional structure in another preferred design form.

The invention also includes the (paper-based) fabric-like composites obtainable by the method according to the described process of the invention.

In another preferred design, the heating process of the particle/polymer composite is carried out by passing it between two metal rollers arranged axially parallel and rotating in the direction of passage, whereby a) at least one of the metal rollers has a defined surface structure of the contact surface to the fabric-like composite, b) the gap between the contact surfaces of the two metal rolls is smaller than the thickness of the fabric-like composite, and c) the passage of the fabric-like composite between the contact surfaces of the two metal rolls is driven at a speed corresponding to the rotational speed of the contact surfaces of the two metal rolls.

It is self-explanatory for the expert that the defined surface structure of the contact surface of the at least one metal roller represents the negative of the surface structure formed on the particle/polymer molding. In the present design, the gap width corresponds advantageously to the thickness of the fabric-like composite multiplied by a factor ≤0.98, particularly advantageously by a factor ≤0.6 and particularly advantageously by a factor ≤0.25. In order to form optimally positive surface structures on the fabric-like composite material, it is essential that the fabric-like composite is passed between the contact surfaces of the two metal rolls at a speed (in m/sec) that corresponds to the rotational speed of the contact surfaces (in m/sec) of the two metal rolls. This design is particularly suitable for the manufacturing of flat, planar fabric-like articles with an embossed surface structure.

The thickness of a fabric-like composite in layer form before the heating process is usually in the range ≥0.3 mm and ≤30 mm, often in the range ≥0.4 mm and ≤1.5 mm and often in the range ≥0.5 mm and ≤7.5 mm.

The fabric-like composite obtainable according to the invention have good handling properties, mechanical stability as well as good mechanical and surface properties and are therefore advantageously suitable as fabric- or textile-substitutes, for example as wall panels, floor elements, for preparing room decoration products, textile furniture, for example to cover chairs, seats or sofas, or back surfaces of furniture. In principle, the fabric-like composite materials of the invention can be used similarly as conventional textiles or bonded leather. Preferred is the use of the fabric-like composite materials in the manufacturing of clothing, bags and shoes, or various other products, including accessories such as desk pads, drawer inserts, mousepads, menus etc.

It is further possible to submit the non-woven fabric-like composites as described herein to embossing, thereby preparing articles with an embossed three-dimensional surface structure by embossing the non-woven fabric-like composite based on a mixture of shredded polymer-glued or polymer-coated paper products and coffee grounds.

Accordingly, articles with embossed three-dimensional surface structure based on a mixture of shredded polymer-glued or polymer-coated paper products and coffee grounds are also part of the invention. Such articles with embossed three-dimensional surface structure are made from the non-woven fabric-like composites of the invention. Such embossed articles are particularly suitable as decorative elements but also as specific parts which need a fleece-like texture and a specific embossed surface structure. Examples include car interior covers or any other fleece-like/textile embossed cover. The method of the invention allows to produce a broad variety of tailor-made surface covers fitting the specific technical and/or design needs for the desired application.

EXAMPLES

Example 1

Raw Materials:
  18.75 g paper with dispersion-based inner coating (for beverages) (atro)
  18.75 g coffee grounds with fine grain (atro)
  200 g Polymin SK solution diluted to 0.25% (atro)
  125 g dispersion (10%) e.g. Acronal 500 D or Acronal 5400
  5 liters water Procedure:
The paper with dispersion-based internal coating (for beverages) is comminuted using an Alpine cutting mill and water (5% solids) and then ground in a grinding roller mill with further addition of water so that a solids content of 2% is achieved. A grinding degree of 35-45 SR according to Schopper Riegler is aimed for. Shortly before the end of the grinding process, the coffee grounds are added, diluted with the appropriate amount of water to a solids content of 2%. After the end of the grinding process, the dispersion is slowly added to the fiber/coffee grounds slurry while stirring. When a good mixing is achieved, the Polymin SK is added. After a few minutes the liquor should be clear. The end point of precipitation can be seen when a sample of the fiber pulp poured onto a filter or sieve gives a clear filtrate. After precipitation is complete, the cellulose fiber/coffee grounds/binder liquor is dewatered on a sheet former with a screen size of 20×20 cm. The dewatering is accelerated by applying a vacuum. The resulting fiber cake is further dewatered and compacted in a stacking press between rubber, filter paper, screen and a damp cloth. (Structure in the press: Rubber mat, filter paper, sieve, damp cloth, fiber CS cake, damp cloth, sieve, filter paper, rubber mat). The fiber coffee cake obtained in this way is then dried at RT or at temperatures of up to 100° C. Furthermore, the dried board obtained in this way can then be further compacted in a press after 24 hours of conditioning. The sheet produced in this way has a thickness of 1.3 mm and a density of 0.85 g/cm$^3$.

Measurement:
The tensile strength, the elongation and the tear strength are determined on the plate.
Tensile Modulus of Elasticity:
  F(1%)=3.1 N/mm$^2$; F(5%)=8.6 N/mm$^2$
  Tearing force=8.8 N/mm$^2$
  Elongation: 12%
  Tear force: 2.6 N

Example 2

Raw Materials:
  18.75 g paper with dispersion-based inner coating (for beverages) (atro)
  18.75 g coffee grounds with coarse grain (atro)
  200 g Polymin SK solution diluted to 0.25% (atro)
  125 g dispersion (10%) e.g. Acronal 500 D or Acronal 5400
  5 liters water Procedure:
The paper with dispersion-based internal coating (for beverages) is comminuted using an Alpine cutting mill and water (5% solids) and then ground in a grinding roller mill with further addition of water so that a solids content of 2% is achieved. A grinding degree of 35-45 SR according to Schopper Riegler is aimed for. Shortly before the end of the grinding process, the coffee grounds are added, diluted with the appropriate amount of water to a solids content of 2%. After the end of the grinding process, the dispersion is slowly added to the fiber/coffee grounds slurry while stirring. When a good mixing is achieved, the Polymin SK is added. After a few minutes the liquor should be clear. The end point of precipitation can be seen when a sample of the fiber pulp poured onto a filter or sieve gives a clear filtrate. After precipitation is complete, the cellulose fiber/coffee grounds/binder liquor is dewatered on a sheet former with a screen size of 20×20 cm. The dewatering is accelerated by applying a vacuum. The resulting fiber cake is further dewatered and compacted in a stacking press between rubber, filter paper, screen and a damp cloth. (Structure in the press: Rubber mat, filter paper, sieve, damp cloth, fiber CS cake, damp cloth, sieve, filter paper, rubber mat). The fiber coffee cake obtained in this way is then dried at RT or at temperatures of up to 100° C. Furthermore, the dried board obtained in this way can then be further compacted in a press after 24 hours of conditioning. The sheet produced in this way has a thickness of 1.40 mm and a density of 0.78 g/cm$^3$.

Measurement:
The tearing force, the elongation and the tear propagation force are determined on the panel.
  Tearing forces: F(1%)=2.9 N/mm$^2$; F(5%)=8.5 N/mm$^2$
  Tearing force=8.6 N/mm$^2$
  Elongation: 13%
  Tear force: 3.6 N

Example 3

Raw Materials:
  18.75 g paper with dispersion-based inner coating (for beverages) (atro)
  18.75 g coffee grounds with fine grain (atro)
  200 g Polymin SK solution diluted to 0.25% (atro)
  125 g dispersion (10%) e.g. Acronal 500 D or Acronal 5400
  5 liters water Procedure:
The paper with dispersion-based internal coating (for beverages) is comminuted using an Alpine cutting mill and water (5% solids) and then ground in a grinding roller mill with further addition of water so that a solids content of 2% is achieved. A grinding degree of 35-45 SR according to Schopper Riegler is aimed for. Shortly before the end of the grinding process, the coffee grounds are added, diluted with the appropriate amount of water to a solids content of 2%. After the end of the grinding process, the dispersion is slowly added to the fiber/coffee grounds slurry while stirring. When a good mixing is achieved, the Polymin SK is added. After a few minutes the liquor should be clear. The end point of precipitation can be seen when a sample of the fiber pulp poured onto a filter or sieve gives a clear filtrate. After precipitation is complete, half of the cellulose fiber/coffee grounds/binder liquor is dewatered on a sheet former with a screen size of 20×20 cm. The dewatering is accelerated by applying a vacuum. The resulting fiber cake is further dewatered and compacted in a stacking press between rubber, filter paper, screen and a damp cloth. (Structure in the press: Rubber mat, filter paper, sieve, damp cloth, fiber CS cake, damp cloth, sieve, filter paper, rubber mat). The fiber coffee cake obtained in this way is then dried at RT or at temperatures of up to 100° C. Furthermore, the dried board obtained in this way can then be further compacted in a press after 24 hours of conditioning. The sheet produced in this way has a thickness of 0.58 mm and a density of 0.75 g/cm$^3$.

Measurement:

The tearing force, the elongation and the tear propagation force are determined on the plate.

Tearing forces: F(1%)=1.6 N/mm$^2$; F(5%)=4.0 N/mm$^2$
Tearing force=5.0 N/mm$^2$
Elongation: 13%
Tear force: 1.2 N Example 4

Raw Materials:
37.5 g paper with dispersion-based inner coating (for beverages) (atro).
200 g Polymin SK solution diluted to 0.25
125 g dispersion (10%) e.g. Acronal 500 D or Acronal 5400
5 liters water Procedure:

The paper with dispersion-based internal coating (for beverages) is comminuted using an Alpine cutting mill and water (5% solids) and then ground in a grinding roller mill with further addition of water so that a solids content of 2% is achieved. A grinding degree of 35-45 SR according to Schopper Riegler is aimed for. Shortly before the end of the grinding process, the coffee grounds are added, diluted with the appropriate amount of water to a solids content of 2%. After the end of the grinding process, the dispersion is slowly added to the fiber/coffee grounds slurry while stirring. When a good mixing is achieved, the Polymin SK is added. After a few minutes the liquor should be clear. The end point of precipitation can be seen when a sample of the fiber pulp poured onto a filter or sieve gives a clear filtrate. After precipitation is complete, half of the cellulose fiber/coffee grounds/binder liquor is dewatered on a sheet former with a screen size of 20×20 cm. The dewatering is accelerated by applying a vacuum. The resulting fiber cake is further dewatered and compacted in a stacking press between rubber, filter paper, screen and a damp cloth. (Structure in the press: Rubber mat, filter paper, sieve, damp cloth, fiber CS cake, damp cloth, sieve, filter paper, rubber mat). The fiber coffee cake obtained in this way is then dried at RT or at temperatures of up to 100° C. Furthermore, the dried board obtained in this way can then be further compacted in a press after 24 hours of conditioning. The sheet produced in this way has a thickness of 0.63 mm and a density of 0.7 g/cm$^3$.

Measurement:

The tearing force, the elongation and the tear propagation force are determined on the plate.

Tearing forces: F(1%)=3.6 N/mm$^2$; F(5%)=9.2 N/mm$^2$
Tearing force=9.3 N/mm$^2$
Elongation: 10%
Tear force: 1.0 N Example 5

Raw Materials:
33.75 g paper with dispersion-based inner coating (for beverages) (atro)
3.75 g coffee grounds with fine grain (atro)
200 g Polymin SK solution diluted to 0.25% (atro)
125 g dispersion (10%) e.g. Acronal 500 D or Acronal 5400
5 liters water Procedure:

The paper with dispersion-based internal coating (for beverages) is comminuted using an Alpine cutting mill and water (5% solids) and then ground in a grinding roller mill with further addition of water so that a solids content of 2% is achieved. A grinding degree of 35-45 SR according to Schopper Riegler is aimed for. Shortly before the end of the grinding process, the coffee grounds are added, diluted with the appropriate amount of water to a solids content of 2%. After the end of the grinding process, the dispersion is slowly added to the fiber/coffee grounds slurry while stirring. When a good mixing is achieved, the Polymin SK is added. After a few minutes the liquor should be clear. The end point of precipitation can be seen when a sample of the fiber pulp poured onto a filter or sieve gives a clear filtrate. After precipitation is complete, half of the cellulose fiber/coffee grounds/binder liquor is dewatered on a sheet former with a screen size of 20×20 cm. The dewatering is accelerated by applying a vacuum. The resulting fiber cake is further dewatered and compacted in a stacking press between rubber, filter paper, screen and a damp cloth. (Structure in the press: Rubber mat, filter paper, sieve, damp cloth, fiber CS cake, damp cloth, sieve, filter paper, rubber mat). The fiber coffee cake obtained in this way is then dried at RT or at temperatures of up to 100° C. Furthermore, the dried board obtained in this way can then be further compacted in a press after 24 hours of conditioning. The plate produced in this way has a thickness of 0.64 mm and a density of 0.72 g/cm$^3$ when compacted.

Measurement:

The tearing force, the elongation and the tear propagation force are determined on the plate.

Tearing forces: F(1%)=3.0 N/mm$^2$; F(5%)=8.2 N/mm$^2$
Tearing force=8.3 N/mm$^2$
Elongation: 11%
Tear force: 0.8 N

The invention claimed is:

1. A process of manufacturing a non-woven composite material, the process comprising:
   (i) providing a particulate substrate S, comprising a mixture of (a) shredded polymer-glued or polymer-coated paper products and (b) coffee grounds,
   (ii) dispersing the substrate S in a dispersant to obtain a dispersion,
   (iii) adding a polymer P to the dispersion,
   (iv) adding a precipitation agent to the dispersion to afford a precipitated particle composition,
   (v) sieveing the precipitated particle composition,
   (vi) transferring the sieved precipitated material into a desired form,
   (vii) subjecting the formed material to vacuum to remove dispersant,
   (viii) pressing the formed material, and
   (ix) drying the resulting formed material to obtain a non-woven fabric material.

2. The process of claim 1, wherein the substrate S is obtained by shredding, cutting, chopping, milling, or crushing paper products, the paper products comprising a polymer-based glue and/or a polymer-coating.

3. The process of claim 1, wherein the polymer-glued or polymer-coated paper products are selected from polymer-coated disposable paper products, including polymer-coated paper take-away cups, dishes, bowls, bags, beverage cartons or packages.

4. The process of claim 1, where in the polymer P is provided in the form of an aqueous dispersion.

5. The process of claim 3, where in the polymer P is provided in the form of an aqueous dispersion.

6. The process of claim 1, wherein the non-woven fabric material is provided in the form of a layer, sheet or floor.

7. The process of claim 4, wherein the non-woven fabric material is provided in the form of a layer, sheet or floor.

8. The process of claim 1, wherein the weight ratio of substrate S to polymer P is $\geq 1$ and $\leq 9$.

9. The process of claim 5, wherein the weight ratio of substrate S to polymer P is $\geq 1$ and $\leq 9$.

10. The process of claim 1, wherein the paper-based particle/polymer composite obtained is sheet-like and has a basis weight $\geq 150$ and $\leq 30,000$ g/m$^2$.

11. The process of claim 5, wherein the paper-based particle/polymer composite obtained is sheet-like and has a basis weight $\geq 150$ and $\leq 30,000$ g/m$^2$.

12. The process of claim 7, wherein the paper-based particle/polymer composite obtained is sheet-like and has a basis weight $\geq 150$ and $\leq 30,000$ g/m$^2$.

13. The process of claim 6, wherein the paper-based particle/polymer composite obtained is sheet-like and has a basis weight $\geq 150$ and $\leq 30,000$ g/m$^2$.

14. The process of claim 1, wherein the so-obtained non-woven fabric material has a density of 0.50 to 0.98 g/cm.

15. The process of claim 1 further comprising a step of embossing the non-woven fabric material.

16. The process of claim 1 wherein in step (vii) the precipitated particle composition is filled into a mold followed by molding in steps (viii) and (ix) to provide the non-woven fabric material in the form of a three-dimensional shape.

* * * * *